United States Patent Office 3,139,439
Patented June 30, 1964

3,139,439
REACTION PRODUCTS OF ALKYLENE DI-
HALIDES AND DITHIOCARBAMATES
John F. Olin, Kettering, Dayton, Ohio, assignor to Pennsalt Chemicals Corporation, Philadelphia, Pa., a corporation of Pennsylvania
No Drawing. Filed June 6, 1960, Ser. No. 33,910
9 Claims. (Cl. 260—327)

This invention relates to a novel class of heterocyclic compounds, to their preparation, and to their use as oil well bactericides and as agricultural chemicals. More particularly, the novel compounds of this invention have the following chemical structure:

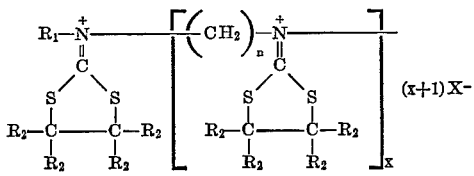

where the $R_1$ radicals are alkyl, cycloalkyl, or aralkyl radicals, the $R_2$ radicals are hydrogen, alkyl, cycloalkyl, haloalkyl or aryl radicals, $X^-$ is a halogen or hydroxyl ion, $n$ is a small integer greater than one, and $x$ is zero or a small integer.

It is well known in the chemical art to react alkali metal salts of dithiocarbamates with an alkyl halide to obtain esters of the dithiocarbamate acids; viz.

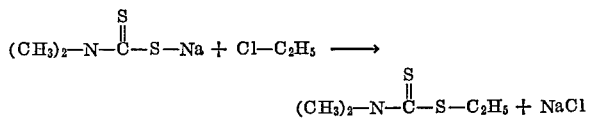

Likewise, it is known from U.S. Pat. 2,744,898 that a polyhaloolefin (e.g. an alkenyl dihalide) will react with an alkali metal dithiocarbamate to yield the haloalkenyl ester. Thus, sodium dimethyldithiocarbamate and 1,3-dichloro-2-butene yield 3-chloro-2-butenyl-dimethyldithiocarbamate. It is also known to prepare bisalkylene diesters of dithiocarbamates by reaction of two moles of the dithiocarbamate salt with one mole of an alkylene dihalide. Thus, U.S. Pat. 2,384,577 shows the preparation of methylene bis(dimethyldithiocarbamate) by reaction of methylene dichloride with sodium dimethyldithiocarbamate. This patent also discloses that instead of using methylene dichloride, other acyclic dihaloalkanes may be employed to give similar diesters such as ethylenedichloride, ethylenedibromide, trimethylenedibromide, and the like although no examples are given to confirm this prediction.

It has now been unexpectedly found, however, that when alkali metal dithiocarbamates are reacted with certain alkylene dihalides in accordance with this invention, simple ester formation does not occur, but a novel class of compounds is obtained. Now, according to this invention, the novel heterocyclic compounds above defined wherein $X^-$ is $Br^-$ are obtained by reacting an alkali metal salt of a dithiocarbamate with a stoichiometric excess of an ethylene dihalide having the structure

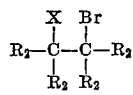

where $R_2$ is selected from the group of hydrogen, alkyl, cycloalkyl, haloalkyl, and aryl radicals and X is a halogen atom selected from the group of bromine and chlorine atoms.

To prepare these novel bromides it is preferred to add a solution of the dithiocarbamate salt, preferably an aqueous, an alcoholic, or an aqueous-alcoholic solution of the dithiocarbamate, to a stirred solution of the dihalide in a solvent such as an alcohol or aromatic hydrocarbon (e.g. benzene). By adding the dithiocarbamate to the dihalide an excess of dihalide is always present. The process is exothermic and is triggered by mild heating of the dihalide solution to about 50° to 90° C. The products are isolated readily in the usual manner by crystallization, by evaporation of the solvent medium, by extraction, or by combinations of these techniques.

The alkali metal dithiocarbamate reactants are well known compounds prepared by reaction of carbon disulfide with the appropriate amine in an aqueous alkali metal hydroxide solution. The dithiocarbamates may be derived from any of a wide variety of secondary mono- and polyamines such as N,N-di-alkyl amines, N-alkyl-N-cycloalkyl amines, N,N-dicycloalkyl amines, N,N-di-aralkyl amines, N-alkyl-N-aralkyl amines, N,N'-dialkylalkylene diamines, N,N''-dialkyl-dialkylene triamines, and the like. Some specific amines which exemplify these classes are dimethylamine, ethyl methylamine, methylcyclohexylamine, dibutylamine, dicyclohexylamine, di-n-octylamine, di-dodecylamine, dibenzylamine, benzyl-methylamine, N,N'-diethyl-1,6-hexanediamine, N,N'-dimethyl - 1,4-butanediamine, N,N'-dimethyl-ethylene diamine, N,N''-dimethyl-diethylene triamine, and the like. Preferably, the dithiocarbamates used will be N,N-dialkyldithiocarbamates containing from one to about twelve carbon atoms in each alkyl radical. It will be understood that mixtures of amines may be reacted with the carbon disulfide and the mixture of dithiocarbamates thus formed reacted with the dihalide to produce mixtures of products.

The ethylene dihalides having the above defined structure are also readily available compounds. It will be observed that dichlorides are excluded from the above structure since the compounds with structures like those of this invention are not obtained when dichlorides are used. Thus the dihalides operable include dibromides and bromo-chlorides as defined by the structural formula. The dihalides, as indicated, must be 1,2-dihalides since methylene dihalides and 1,3-dihalides give esters. However, because the $R_2$ groups may be selected from any of a wide variety of radicals, the 1,2-dihalides which may be used are large in numbers. As indicated, the $R_2$ radicals may be hydrogen, alkyl, cycloalkyl, haloalkyl, and aryl radicals and they may be the same or different. In order to avoid low reaction rates due to steric hindrance, however, it is preferred that not all the $R_2$ radicals of the dihalide used be bulky radicals (e.g. phenyl or naphthyl). Preferably, 1,2-dihalides will be used in which at least two $R_2$ radicals are hydrogen atoms. Specific examples of the dihalides which may be used include 1-bromo-2-chloroethane, 1,2-dibromoethane, 1,2,3-tribromopropane, 1,2-dibromo-3-chloropropane, 1,2-dibromo-1-phenylethane, 1,2-dibromo-n-hexane, 1,2-dibromo-n-octane, 1,2-dibromo-1-cyclohexylethane, 1,2-dibromo-1,2-diethylethane (i.e., 3,4-dibromo-n-hexane), 1-bromo-2-chloro-1,2-diphenylethane, 1,2-dibromo-eicosane, 1,2-dibromo-1-naphthylethane, and the like. Preferably, the dihalides will be those where $R_2$ is hydrogen or where at least two $R_2$ radicals are hydrogen and the remaining $R_2$ radicals are hydrocarbon radicals containing up to twelve carbon atoms.

As can be seen from the above generic structure, the novel compounds obtained by the process of this invention are bromide salts. Accordingly, the lower molecular weight members of this class of compounds are water soluble and give a positive test for the bromide ion. When a simple dithiocarbamate (e.g. sodium dimethyldithiocarbamate) is reacted with the 1,2-dihalide, the value of $x$ is zero and the products will have the structure

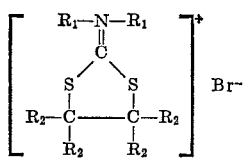

where $R_1$ and $R_2$ are defined above.

When the dithiocarbamate is derived from an alkylene diamine, the value of $x$ is one and the integer $n$ corresponds to the number of methylene groups in the diamine chain. Thus, one mole of the bis-dithiocarbamate from N,N'-diethyl-1,4-butanediamine reacts with two moles of 1,2-dibromoethane to give

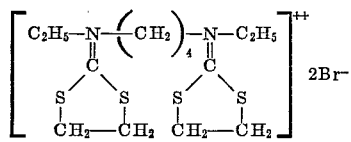

When the dithiocarbamate is a polydithiocarbamate derived from a polyalkylene polyamine the value of $x$ is greater than one. Thus, with the tri-dithiocarbamate from N,N''-dimethyl-diethylenetriamine and 3,4-dibromohexane the compound obtained is

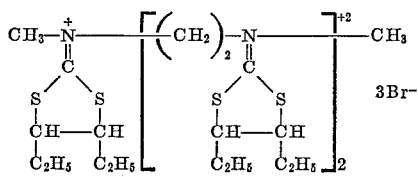

As indicated, the process of this invention yields the novel compounds where X is a bromide ion. However, these bromides are readily converted to other halide salts or hydroxides. Thus the bromide is converted to the chloride compound by blowing air through an aqueous solution of the bromide containing HCl and a small amount of $HNO_3$. In this way the bromide ion is oxidized to $Br_2$ which is volatilized from the system leaving the chloride which is readily isolated. The same technique can be used to obtain the fluoride salt using HF instead of HCl. The hydroxide is readily obtained by reacting silver oxide with the bromide salt in the manner used to convert quaternary halides to hydroxides.

The lower molecular weight members of this novel class of heterocyclic compounds are colorless, crystalline solids, soluble in water, and have sharply defined melting points. As the molecular weight increases above about 350 the compounds become oils or waxy solids. Where the compounds have a long chain substituent they are effective surfactants by virtue of their combined ionic (hydrophylic) and oleophylic character. These compounds also have antimicrobial and disinfectant activity as expected from their similarity to quaternary ammonium halides. Those compounds wherein $R_1$ is a lower alkyl group (i.e., from one to four carbon atoms) are useful as insecticides, being particularly effective on mites and roaches. When the $R_1$ radical is a long chain radical containing from about six to about twelve carbon atoms the compounds are valuable agricultural chemicals being most effective as plant defoliants and such compounds are also of particular value as bactericides against bacteria in oil wells (genus Desulfovibrio) which cause corrosion and deterioration of submerged metal installations. When used for this latter purpose it is merely required that the agent be incorporated in an aqueous drilling mud or a separate treatment of the well may be made by flushing an aqueous solution of the compound through the system. In still another technique an aqueous solution of the agent may be injected batchwise or continuously in the well tubing-casing annular space. The concentration of agent in the aqueous solution will usually be from about 5 to 50 p.p.m.

The following examples will further illustrate the preparation and use of the novel compounds of this invention.

EXAMPLE 1

A solution of 225 g. (1.55 m.) of ethylenechlorobromide in 100 g. of methanol is placed in a flask fitted with a mechanical stirrer. Then an aqueous solution containing 439 g. (1 m.) of sodium dibutyldithiocarbamate is added dropwise. A mild exothermic reaction occurs and the temperature of the reaction mass is held at about 50° C. by external cooling. When the addition is complete the adqueous solution is evaporated under vacuum to a volume of about 400 cc. and 1 liter of isopropanol is added and the solid NaCl which precipitates from solution is filtered off. Then, 500 cc. of benzene is added to the filtrate and the solution is evaporated under vacuum to 400 cc. volume. Then, 500 cc. of toluene is added and the vacuum distillation is continued, another 1000 cc. of toluene being added during the distillation to remove all the water. When the water is entirely removed, crystallization begins and the mass is held refrigerated overnight. The crystals are then filtered off, dried at 70° C.; the weight of dried crystals being 328 g. The dry, white crystals melt at 120° to 122° C. They are soluble in water, ethanol, and hot acetone, but insoluble in cold acetone, benzene and hexane. A test for bromide ion on the aqueous solution of the compound is found to be positive. Based on this and the analysis of the compound, the structure is designated as follows:

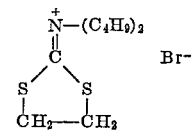

*Analysis.*—Found/Theory: Percent C, 42.28/42.3; percent H, 7.13/7.10; percent N, 4.47/4.48; percent S, 20.56/20.53; percent Br, 25.63/25.59

EXAMPLE 2

A solution of 287 g. (2 m.) of ethylenechlorobromide in 300 g. of methanol is placed in a flask fitted with a mechanical stirrer and the solution is heated to 50° C. Then as the solution is stirred, a 40% by weight aqueous solution of dimethyldithiocarbamate containing 714 g. (2 m.) of sodium dimethyldithiocarbamate is added dropwise over a one-hour period, cooling as necessary to maintain the temperature at about 60° C. The reaction mass is then allowed to stand 48 hours after which it is twice extracted with 200 cc. of toluene, and the extract evaporated until virtually dry. The resulting oil and salt residue is taken up in about 600 cc. of warm butanol and filtered to remove the NaCl. To the filtrate is then added a liter of toluene and the solution cooled, after which a large crop of crystals is obtained. These are filtered, sucked dry, and are dried in an oven at 65° C. thus obtaining 370 g. of colorless crystals melting at 166–168° C. The product which has the structure

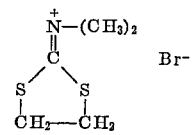

is soluble in water, alcohol, and slightly soluble in toluene. It is insoluble in hexane and acetone.

*Analysis.*—Found/Theory: Percent Br, 34.2/35.7; percent S, 27.6/28.

EXAMPLE 3

A solution of 40.5 g. of 98% sodium hydroxide in 350 g. of methanol is prepared and 241 g. (1 m.) of dioctylamine is added with agitation while cooling the reaction mass at ice-water temperature. Then 80 g. of carbon disulfide is added dropwise and stirring is continued for an additional 30 minutes after the carbon disulfide had been completely added. Excess carbon disulfide is removed from the reaction mass by warming and applying slight vacuum.

A solution of 160 g. of ethylenechlorobromide in 100 g. of methanol is placed in a flask equipped with mechanical stirrer and the above dithiocarbamate solution is slowly added. A mild exothermic reaction is observed, the temperature rising to 60° C. where it is held during the reaction period. When the addition of the dithiocarbamate solution is completed the reaction mass is stirred at 60° C. for another half hour and the reaction mass filtered to remove the sodium chloride which had formed. The filtrate is partially distilled under reduced pressure on a water bath and the residue obtained is dissolved in 400 cc. of benzene and filtered to remove some additional salt which separates. The filtrate is again evaporated to dryness yielding 427 g. of clear syrup which is dissolved in 50% aqueous methanol and that solution is extracted with ligroin. The methanol solution is then evaporated to dryness on a water bath under vacuum and on standing overnight in the ice box it turns to waxy solid which liquefies at about 15° C.

The product is assigned the following structure:

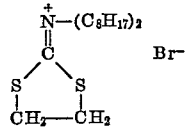

EXAMPLE 4

Following the details of Example 3, sodium di-didecyl-dithiocarbamate is prepared and reacted with ethylenechlorobromide. The product has the structure:

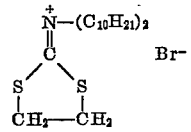

and is a pale yellow oil which solidifies on standing and melts at about 28° C.

EXAMPLE 5

Following the details of Example 2, sodium dimethyl-dithiocarbamate solution is added to a methanol solution of 1,2,3-tribromopropane. The reaction mass is then vacuum distilled, the residue is taken up with water which is again vacuum distilled off, and the residue extracted with warm methanol. The methanol solution is evaporated to dryness on a water bath under vacuum and taken up in a small amount of hot water and the solution is placed in a refrigerator. The crystals which form are filtered off, washed with a small amount of cold water and oven dried. The product which is assigned the structure:

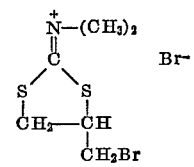

is soluble in chloroform, ethanol and water and insoluble in most other solvents. The crystalline product decomposes at 250° C.

EXAMPLE 6

A solution of 240 g. of 1,2-dibromoethylbenzene (0.91 moles) in 100 g. of benzene is heated to 60° C. and 529 g. (0.91 moles) of a methanolic sodium dibutyldithiocarbamate solution is slowly added over one half hour period. The salt is filtered off and the filtrate distilled on a water bath. Upon taking up the residue with hot acetone and filtering, the filtrate upon evaporation to dryness yields a viscous amber colored oil which is confirmed by bromine analysis to be

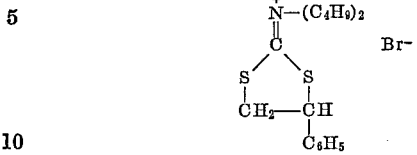

EXAMPLE 7

N,N-dibenzyldithiocarbamate sodium salt is prepared from dibenzyl amine and carbon disulfide in an aqueous butanol solution containing caustic. This dithiocarbamate solution (1 mol) is added to a solution of 157 g. (1.1 mol) of ethylenechlorobromide in 100 g. of butanol heated to 60° C. The reaction mass is evaporated under vacuum and is extracted with an aqueous methanol solution from which is obtained pale yellow crystals melting at 164 to 165° C. These crystals are soluble in water and ethanol, insoluble in acetone and benzene. The compound is assigned the structure

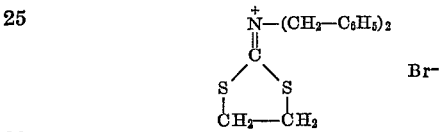

EXAMPLE 8

To a solution of 240 g. (0.88 mol) of 1,2-dibromo-octane in 200 cc. of isopropanol there is slowly added with stirring and at 80° C., 480 g. of a 30.6% aqueous solution of sodium diethyldithiocarbamate. The reaction product contains a small amount of yellow oil which is removed by extraction with several portions of carbon tetrachloride. The aqueous alcoholic reaction mass is then evaporated to dryness under vacuum, and the residue is taken up with 150 cc. of butanol and 200 cc. of acetone from which was filtered off the sodium bromide salt which had formed. The filtrate is evaporated under vacuum, and the light yellow residual oil is taken up with 250 cc. of acetone and again evaporated to dryness under vacuum. The pale amber syrup which is obtained is assigned the structure

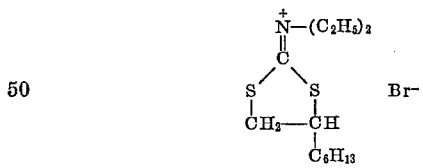

*Analysis.*—Found/Theory: Percent Br, 23.9/23.5; percent S, 18.3/18.8.

EXAMPLE 9

Following the details of Example 8, 1,2-dibromo-dodecane is reacted with sodium diethyldithiocarbamate to yield an oil of structure

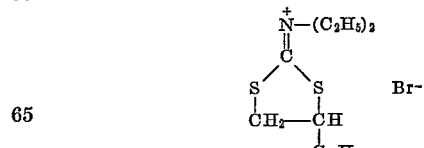

*Analysis.*—Found/Theory: Percent Br, 19/20.2.

EXAMPLE 10

An excess of carbon disulfide is slowly added to an aqueous caustic solution of N,N'-diethyl-ethylenediamine in order to prepare the corresponding dithiocarbamate. A slurry of this dithiocarbamate is then added to an alcoholic solution of ethylenechlorobromide at reflux and a mild exothermic reaction is observed to occur. After the addition is complete the mixture is refluxed for an additional 15 minutes and then most of the alcohol is distilled off and the aqueous solution extracted three times with chloroform. The aqueous portion of the extract is evaporated to dryness and the water is removed by repeated distillations with a mixture of pentanols, with isopropanol, and finally with a mixture of isopropanol and benzene. After standing overnight the residue obtained is partly crystalline. Toluene is then added and the mixture is cooled to $-15°$ C. The crystals thus obtained are filtered off and washed with acetone containing a little methanol. The very deliquescent crystals are taken up in hot isopropanol, filtered, and the crystals again taken up in benzene and the mass azeotropically dehydrated. The residue is cooled to $-15°$ C. and the crystalline solid obtained is filtered off and washed with isopropanol and dried. The white crystals melt at 203–208° C. with decomposition. Analysis as shown below confirms the following structure:

$$C_2H_5-\overset{+}{N}=\overset{CH_2-CH_2}{\underset{S}{C}}\overset{+}{N}-C_2H_5 \quad 2Br^-$$
$$\underset{CH_2-CH_2}{S\diagdown\diagup S}\quad\underset{CH_2-CH_2}{S\diagdown\diagup S}$$

*Analysis.*—Found/Theory: Percent N, 5.2/5.8; percent S, 25.0/26.7.

EXAMPLE 11—USE AS PLANT DEFOLIANT

An aqueous dispersion of 0.2% by weight of the test compound is prepared and applied to mature cotton plants at a rate of 125 gallons per acre. The number of leaves per plant is determined before the application and two weeks after treatment. The results are expressed as percent of leaves defoliated.

When the compound of Example 3 is evaluated by this test, 100% defoliation is obtained and with the compound of Example 4, 73% defoliation is achieved.

EXAMPLE 12—USE AS OIL WELL BACTERICIDE AND CORROSION INHIBITOR

A. *Corrosion Inhibition of Oilfield Water*

Standard corrosion test steel coupons are placed in airtight bottles which are then filled completely with a corrosive oilfield water to which is added fixed quantities of the inhibitor to be tested. The bottle is then closed and attached to a wooden wheel that is rotated at a constant speed of 20 r.p.m. by an electric motor for a period of 72 hours. The coupon is of such size that it will move up and down freely in the bottle filled with the corrosive liquid as the wheel rotates. Thus the coupon will move approximately 86,400 times during the progress of the test.

The bottles are sealed carefully so that the tests are run in oxygen-free medium. The tests are carried on in an air conditioned room at an average temperature of 72° F.

Before being placed in the bottle the steel coupon is weighed carefully. At the end of the test the coupon's condition is observed, it is cleaned, and then reweighed, and the loss in weight, as a result of corrosion recorded. The loss in weight is converted into standard corrosion terminology of IPY and MPY by the following equation:

$$IPY = \frac{24 \times 365 \times w}{(2.54)^3 \times A \times S \times t}$$

where

*IPY*=inches per year
24=number of hours in day
365=days in year
$w$=weight loss of sample in grams
2.54 cm.=1 inch
$A$=area in sq. in.
$S$=sp. gr. of steel coupon
$t$=time in hours MPY is 1,000 times IPY.

The percent efficiency of the inhibitor is calculated as follows:

$$\text{Percent Eff.} = \frac{\text{IPY of Control}-\text{IPY with Inhibitor}}{\text{IPY of Control}}$$

These equations are standard for reporting results of corrosion tests.

The water used in the tests reported herein is a 50–50 mixture of supply water from the Mississippi lime and of produced water from the Bartlesville sand obtained from the Russell lease of Don George, Chanute Field, Neosho County, Kansas. These waters are extremely corrosive and must be treated to prevent the destruction of steel equipment with which they come in contact. The supply water as produced contains appreciable quantities of hydrogen sulfide, most of which is lost by release of pressure.

In order to simulate field conditions the water is artificially charged with $H_2S$ in the laboratory for the purpose of the corrosion tests.

RESULTS OF TESTS

In the tests the coupons are immersed in 220 cc. of the mixed water to which is added 42 p.p.m. $H_2S$. The test was run for 72 hours. The following results are obtained:

| Chemical | Concentration, p.p.m. | Wt. Loss, Grams | IPY | MPY | Percent Efficiency |
|---|---|---|---|---|---|
| Compound of Example 3 | 10 | 0.0017 | 0.000527 | 0.527 | 79.67 |
| Do | 20 | 0.0005 | 0.00016 | 0.160 | 93.83 |
| Control | 0 | 0.0085 | 0.002593 | 2.593 | |

B. *Bactericidal Effects*

The compound of Example 3 is evaluated for potency against *Desulfovibrio desulfuricans* occurring in oil well water from West Texas. In a control test without the additive 14.1 colonies of the bacteria per milliliter are counted after three weeks incubation according to a standard test. With 5 parts per million of the compound of Example 3 the count is 1.4 colonies per milliliter and no colonies at 10 p.p.m.

It will be apparent to the skilled art worker that many changes may be made from the above description of this invention without departing from its spirit and scope and such variations are to be considered as within the purview of the invention.

I claim:

1. Compounds having the chemical structure $$R_1-\overset{+}{N}-\overset{C}{\underset{S\diagdown\diagup S}{\|}}-\left[(CH_2)_n-\overset{+}{N}-\overset{C}{\underset{S\diagdown\diagup S}{\|}}\right]_x-R_1 \quad (x+1)X^-$$
$$R_2-\underset{R_2}{C}-\underset{R_2}{C}-R_2 \quad R_2-\underset{R_2}{C}-\underset{R_2}{C}-R_2$$

where $R_1$ is selected from the group consisting of alkyl of one to twelve carbon atoms, cyclohexyl, and benzyl, $R_2$ is selected from the group consisting of hydrogen, alkyl of one to twelve carbon atoms, cyclohexyl, monohaloalkyl of one to twelve carbon atoms, phenyl and naphthyl, $X^-$ is an ion selected from the group of halogen and hydroxyl ions, $n$ is a small integer from two to six, and $x$ is a cipher between 0 and 3.

2. Compounds of structure $$R_1-\overset{+}{N}-R_1$$
$$\overset{\|}{C}$$
$$S\diagdown\diagup S \quad OH^-$$
$$H\underset{R_2}{C}-\underset{R_2}{C}H$$

9 where $R_1$ is alkyl of one to twelve carbon atoms, $R_2$ is hydrogen.

3. Compounds having the chemical structure

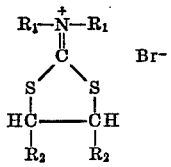

where $R_1$ is alkyl of one to twelve carbon atoms and $R_2$ is hydrogen.

4. A compound as in claim 3 where $R_1$ is decyl and $R_2$ is hydrogen.

5. A compound as in claim 3 where $R_1$ is octyl and $R_2$ is hydrogen.

6. A compound as in claim 3 where $R_1$ is butyl and $R_2$ is hydrogen.

7. A compound as in claim 3 where $R_1$ is ethyl and $R_2$ is hydrogen.

10

8. A compound as in claim 3 where $R_1$ is methyl and $R_2$ is hydrogen.

9. Compounds of the structure

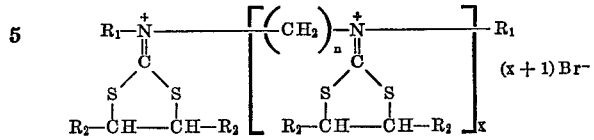

where $R_1$ is alkyl of one to twelve carbon atoms, $R_2$ is hydrogen, $n$ is a small integer from two to six and $x$ is a small integer from one to three.

References Cited in the file of this patent

UNITED STATES PATENTS

| | | |
|---|---|---|
| 2,547,724 | Sundholm | Apr. 3, 1951 |
| 2,643,178 | Wachter et al. | June 23, 1953 |
| 2,701,253 | Jones et al. | Feb. 1, 1955 |
| 2,846,444 | Luettringhaus et al. | Aug. 5, 1958 |
| 2,947,599 | Ennis | Aug. 2, 1960 |

---

UNITED STATES PATENT OFFICE
CERTIFICATE OF CORRECTION

Patent No. 3,139,439           June 30, 1964

John F. Olin

It is hereby certified that error appears in the above numbered patent requiring correction and that the said Letters Patent should read as corrected below.

Column 1, lines 16 to 22, the right-hand portion of the formula should appear as shown below instead of as in the patent:

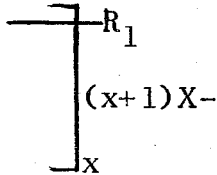

Signed and sealed this 3rd day of November 1964.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,139,439                            June 30, 1964

John F. Olin

It is hereby certified that error appears in the above numbered patent requiring correction and that the said Letters Patent should read as corrected below.

Column 1, lines 16 to 22, the right-hand portion of the formula should appear as shown below instead of as in the patent:

$$\left. \begin{array}{c} -R_1 \\ (x+1)X- \end{array} \right]_x$$

Signed and sealed this 3rd day of November 1964.

(SEAL)
Attest:

ERNEST W. SWIDER  
Attesting Officer

EDWARD J. BRENNER  
Commissioner of Patents